(12) United States Patent
Tvaruzek

(10) Patent No.: US 9,157,423 B2
(45) Date of Patent: Oct. 13, 2015

(54) SWASHPLATE PIVOT BEARING

(75) Inventor: Jaromir Tvaruzek, Dolny Lieskov (SK)

(73) Assignee: DANFOSS POWER SOLUTIONS INC., Ames, IA (US)

( * ) Notice: Subject to any disclaimer, the term of this patent is extended or adjusted under 35 U.S.C. 154(b) by 508 days.

(21) Appl. No.: 13/568,729

(22) Filed: Aug. 7, 2012

(65) Prior Publication Data

US 2013/0213214 A1 Aug. 22, 2013

(30) Foreign Application Priority Data

Feb. 22, 2012 (DE) .......................... 10 2012 202 742

(51) Int. Cl.
- *F04B 1/20* (2006.01)
- *F04B 1/32* (2006.01)
- *F03C 1/06* (2006.01)

(52) U.S. Cl.
CPC .............. *F04B 1/2014* (2013.01); *F03C 1/0644* (2013.01); *F03C 1/0671* (2013.01); *F04B 1/2085* (2013.01); *F04B 1/324* (2013.01)

(58) Field of Classification Search
CPC ....... F04B 1/2014; F04B 1/324; F04B 1/2085
USPC ................... 384/49, 50, 51, 52, 572
See application file for complete search history.

(56) References Cited

U.S. PATENT DOCUMENTS

| | | | |
|---|---|---|---|
| 8,376,615 B2 * | 2/2013 | Becker et al. ............. | 384/2 |
| 2010/0278463 A1 * | 11/2010 | Becker et al. ............. | 384/2 |
| 2011/0007994 A1 * | 1/2011 | Vornehm et al. .......... | 384/572 |

FOREIGN PATENT DOCUMENTS

| | | |
|---|---|---|
| DE | 10 2005 056 088 | 6/2006 |
| DE | 10 2006 023 711 | 11/2007 |
| DE | 10 2005 023 275 | 2/2008 |
| DE | 10 2009 013 094 | 9/2010 |

* cited by examiner

*Primary Examiner* — Nathaniel Wiehe
*Assistant Examiner* — Dustin T Nguyen
(74) *Attorney, Agent, or Firm* — Zarley Law Firm, P.L.C.

(57) ABSTRACT

The invention relates to a swashplate pivot bearing (10) in an adjustment unit of a hydraulic axial piston machine (1) with a timing/tracking mechanism (20) for the cage (14) of a roller bearing arrangement (11). The timing/tracking mechanism (20) is in this case distributed to the two end regions (16, 17, 18) of the roller bearing arrangement (11) in such a way that one part is active only during the pivoting of the swashplate (7) in one direction and the other part is active only during pivoting in the other direction. The timing/tracking mechanism (20) is preferably designed in the manner of a slotted-link control with guide tracks (24, 25, 26) and with a guide element (27, 28).

10 Claims, 3 Drawing Sheets

SWASHPLATE PIVOT BEARING

BACKGROUND OF THE INVENTION

The invention relates to a swashplate pivot bearing of a hydraulic adjustment unit in an axial piston machine of the swashplate type. The invention relates particularly to swashplate pivot bearings having a timing/tracking mechanism.

The delivery capacity or absorption volume of adjustable axial piston machines of the swashplate type is adjusted via a pivotable swashplate in that the swashplate, which in the zero position of the axial piston machine stands perpendicularly to the axis of rotation of the axial piston machine, by being pivoted about a pivot axis perpendicularly to the axis of rotation of the axial piston machine, reduces or increases the volume of the individual cylinders arranged axially with respect to the drive/driven shaft. In this case, the pistons guided slidably on the swashplate, depending on the angular position with respect to their rotation about the axis of rotation of the drive/driven shaft of the axial piston machine, are pushed to a greater or lesser extent into the pressure cylinders of the cylinder block by the pivoted swashplate.

On account of the high forces which are to be supported and which emanate from the pressure cylinders, ring-segment rolling bearings are usually employed in this case as swashplate pivot bearings, preferably cylindrical rolling bodies being used. For this purpose, the swashplates are conventionally designed to be partly cylindrical on the side facing away from the pistons and cylinders. As a counterbearing, the housing for receiving the outer segment of the ring-segment rolling bearings is designed to be partly hollow-cylindrical in this region. When the axial piston machine is in operation, the swashplate pivot bearings are under high load and therefore have to be of robust design. Moreover, the swashplate pivot bearings should ensure uniform easy-running adjustment of the swashplate throughout the lifetime of the axial piston machine, without high frictional forces arising in the swashplate pivot bearing or the swashplate pivot bearing being subjected to premature wear, which may lead to the failure of the axial piston machine. Furthermore, high outlay in terms of the maintenance and/or repair of the swashplate pivot bearings is to be avoided.

A conventional swashplate pivot bearing is known, for example, from DE 10 2005 056 088 A1. According to this prior art, the swashplate is mounted in a roller bearing arrangement which has an inner segment, an outer segment and a cage for guiding a plurality of rollers which are arranged between the inner segment and the outer segment, the inner segment on the swashplate, the outer segment on the housing and the cage between the inner and the outer segment being designed in each case as partial circle segments. The rollers extend only over a circle segment predetermined by the cage and are moved back and forth during the pivoting movement of the swashplate.

In the swashplate pivot bearing described in DE 10 2005 056 088 A1, there is a timing/tracking mechanism which controls the movement of the cage with the effect of limited tracking of the movement of the swashplate. It is necessary for the cage to track the movement or adjustment of the swashplate in order to ensure a favorable rolling movement or roll-off movement of the rollers on the raceways for the rolling bodies on the inner and the outer segment. Since the two raceways, that on the outside of the inner segment and that on the inside of the outer segment, are arranged concentrically, preferably concentrically to the pivot axis of the pivot bearing, the radii of the raceways are different, and during the pivoting of the swashplate sliding or slipping of the rolling bodies occurs if these are not tracked in the circumferential direction in a correcting manner. Such tracking can be implemented, for example, with rolling bodies received in a cage, in that the cage is tracked in the circumferential direction. For this purpose, the arcuate displacement of the cage preferably amounts to half the arcuate displacement of the swashplate in the circumferential direction. Moreover, repeated pivoting/tilting of the swashplate may cause the rollers between the outer segment mounted on the housing and the swashplate to slip into positions other than into the desired optimal supporting positions for counteracting the axial pressure of the swashplate, if the rollers are not tracked. In order to implement this tracking, for example according to DE 10 2005 056 088 A1, a connecting member is provided, which is mounted rotatably on the outer segment and has a slot in which pins fastened to the inner segment and to the cage engage and are guided in such a way that the connecting member limits the arcuate movement of the cage. A similar arrangement with resilient elements for connecting the inner segment, cage and outer segment is known from DE 10 2006 023 711 A1.

According to DE 10 2005 023 275 A1, the tracking of the rollers during pivoting of the swashplate is brought about in that one or more of the rollers are equipped with a gearwheel meshing in each case with toothing on the swashplate and on the housing of the axial piston machine. A disadvantage of using gearwheels is that it is difficult to set the timing, and faulty setting may lead to failure of the bearing and therefore of the entire hydrostatic machine.

DE 10 2009 013 094 A1 describes a swashplate pivot bearing which is designed without a cage for the rollers. The tracking of the rollers or rolling bodies takes place here via a slotted-link control preferably arranged at both ends of the bearing region which the rollers brush over. The tracking device comprises limit stop elements for the rollers, which are moved jointly with the rollers by means of the slotted-link guide during a pivoting movement of the swashplate pivot bearing. One of the slotted links is fixed to a machine in a housing portion and the other moves together with the swashplate, with the result that the limit stop elements connected to the sliding block are displaced with the effect of the desired tracking.

The swashplate pivot bearing according to DE 10 2009 013 094 A1 has no inner segment, but instead the rollers run directly on the swashplate. This necessitates a high quality of the raceway of the rollers on the swashplate, along with a correspondingly high outlay in production terms. The form of construction according to DE 10 2005 056 088 A1 avoids this disadvantage by providing a separate inner segment and a separate outer segment as a raceway for the rollers, the said segments being mounted in each case on the swashplate or on the housing of the hydraulic adjustment unit. This avoids the need for special requirements to be met by the housing and swashplate which do not have to have hardened raceways for the rollers. To connect and adjust the outer segment and inner segment to and with respect to one another and to and with respect to the swashplate and housing, stamped noses are used. However, producing these noses by stamping is difficult and, because of their small size, presents assembly problems.

BRIEF SUMMARY OF THE INVENTION

The object on which the invention is based is, therefore, to provide a swashplate pivot bearing of the type mentioned in the introduction, in which exact, robust and reliable tracking of the cage takes place and which allows simple assembly, the disadvantages of the prior art being avoided. At the same time, the swashplate pivot bearing should be cost-effective to produce and have low wear during operation.

This object is achieved, according to the characterizing clause of Claim 1, in that a first and a second timing/tracking mechanism are formed at each end region of the roller bearing arrangement, and the first timing/tracking mechanism takes effect during the pivoting of the swashplate in one direction and the second timing/tracking mechanism takes effect during the pivoting of the swashplate in the other direction, so that only "half" the timing/tracking mechanism is formed at each end region.

Preferably, the two timing/tracking mechanisms are designed such that the functional elements of the timing/tracking mechanism are arranged outside the path of movement of the rollers of the roller bearing arrangement. This ensures that the rollers can neither deform nor abrade the timing/tracking mechanism. It is preferable in this case that the cage is equipped at each of the two ends with an end piece in which a guide track of the cage guide is formed. All the guide tracks are preferably designed as slots into which a pin, as a guide element and driver of the cage, is slidably displaceable. The guide tracks on the outer segment and on the inner segment may, however, also be designed as grooves, thus preventing the guide element from falling out. However, the cage guide must necessarily be configured as a continuous slot, since it is penetrated completely by the guide element and should not impede the displaceability of the latter in the transverse direction of the pivoting movement of the swashplate.

According to a preferred embodiment of the invention, each timing/tracking mechanism possesses in each case an inner guide, an outer guide and a cage guide which have in each case a slot-shaped guide track in which a guide element is guided slidably, and the inner guide is formed on the inner segment, the outer guide on the outer segment and the cage guide on the cage in their respective end regions or are connected to them. This form of construction, which is conceived in the manner of a slotted-link guide, is especially robust and space-saving. Owing to the shape of the individual guide tracks, an exactly defined profile for the cage to track the pivoting of the swashplate can be stipulated.

Preferably, the guide tracks are formed in such a way that the respective guide track of the inner guide and of the outer guide has a first region extending in the longitudinal direction of the roller bearing arrangement and a second region running obliquely thereto. In each case the first region corresponds to a neutral region, no force being exerted upon the cage when it is run through, since the pin undergoes no action of force and is therefore not driven. By contrast, in the case of overlapping of the in each case second regions running obliquely, a force is exerted upon the pin and is driven by the mutually intersecting guide tracks of the inner guide and of the outer guide. The oblique displacement of the pin, which is mounted transversely displaceably in the guide track of the cage, drives the cage correspondingly to the component perpendicular to its guide track, thus causing the desired tracking of the cage. For this purpose, the guide track of the cage guide runs essentially perpendicularly with respect to the in each case first regions of the guide tracks of the inner guide and of the outer guide.

In a further preferred refinement, the inner segment and outer segment of the roller bearing are connected to one another, preferably the end pieces of the cage being shaped in such a way that they form a positive and displaceable connection to the inner guide and outer guide, the said connection holding the inner segment and outer segment together.

A preferred refinement of the swashplate pivot bearing will be one in which the connection between the inner segment and the outer segment is designed in the manner of a two-sided dovetail, one side of the dovetail cooperating with the inner guide and the other side with the outer guide.

Preferably, the inner segment is connected to the swashplate and the outer segment is connected to a housing part of the hydraulic adjustment unit. Connection preferably takes place in that the respective end regions of the inner guide and of the outer guide are provided with extensions which are connectable positively and/or non-positively to the swashplate or the housing of the axial piston machine.

The invention is explained in more detail below by means of exemplary embodiments illustrated in the figures in which:

DETAILED DESCRIPTION OF THE PREFERRED EMBODIMENTS

Figure 1:
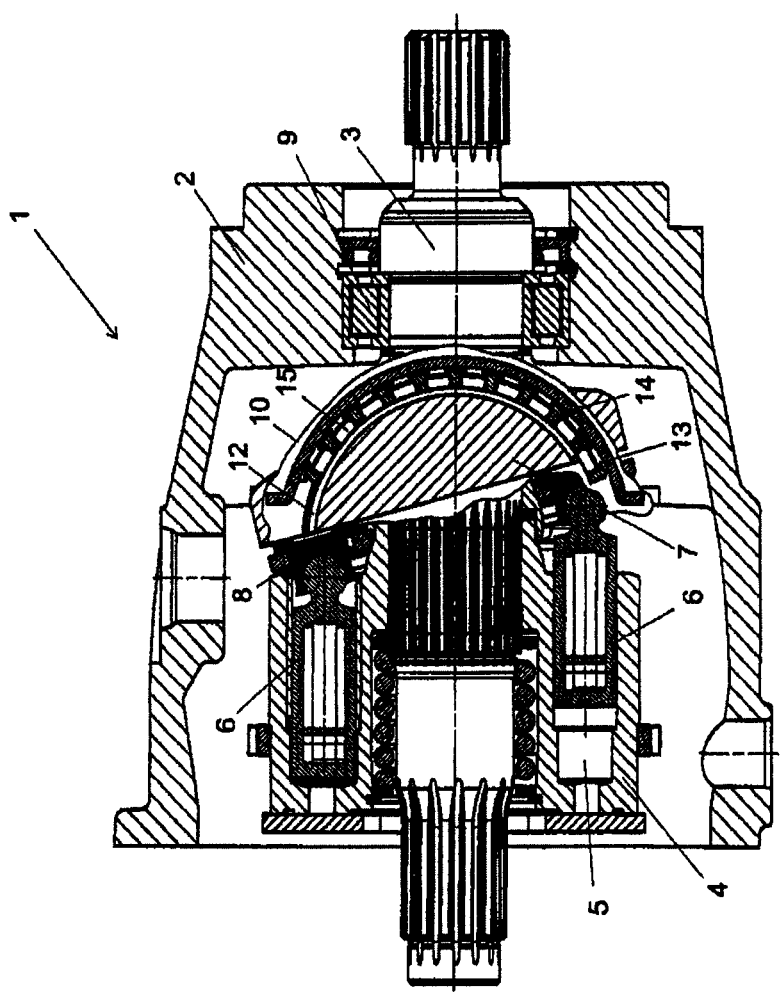
FIG. 1 shows a sectional view of an adjustable axial piston machine with a swashplate pivot bearing.

FIG. 1 illustrates a sectional view of an adjustable hydraulic unit in the form of an axial piston machine 1 of the swashplate type with a generic swashplate pivot bearing 10. The axial piston machine has a housing 2 in which a shaft 3 is mounted rotatably in a bearing 9. The shaft is connected fixedly in terms of rotation to a cylinder block 4, which has a plurality of cylinder bores 5 for the pistons 6, and drives it during rotation. The pistons 6 carry, at the ends projecting out of the cylinder bore 5, a spherical head on which a piston sliding shoe 8 is mounted. The sliding shoes 8 are in contact with the swashplate 7 which is mounted in the housing 2 fixedly, but pivotably in a structurally predetermined angular range with respect to the axis of the shaft 3. For this purpose, the swashplate 7 is held with respect to the housing 2 in a swashplate pivot bearing 10 which is designed as a roller bearing arrangement 11. The swashplate 7 is pierced contactlessly by the shaft 3 and is supported with respect to the housing 2, for example, in two identically designed roller bearing arrangements 11.

The roller bearing arrangement 11 is configured, for example, as a cradle bearing, with an inner segment 12, which is arranged on the cylindrical underside of the swashplate 7, and an outer segment 13, which is supported on the housing 2 and is connected to the latter. The inner segment 12 and the outer segment 13 are spaced apart from one another and serve as sliding tracks for the rollers 15 arranged between them. The rollers 15 are held and guided in a cage 14. The inner segment 12, outer segment 13 and cage 14 are in each case formed as concentric segments of a circle, the center of which is preferably arranged on the pivot axis.

Since FIG. 1 is intended to show only the essential elements of an axial piston machine 1 and the arrangement of the swashplate pivot bearing, neither the adjustment mechanism for pivoting the swashplate 7 nor the timing/tracking mechanism 20 according to the invention are illustrated, thus affording greater clarity. The former mechanism is known to a person skilled in the art and the latter is explained in more detail by means of the following figures.

Figure 2:
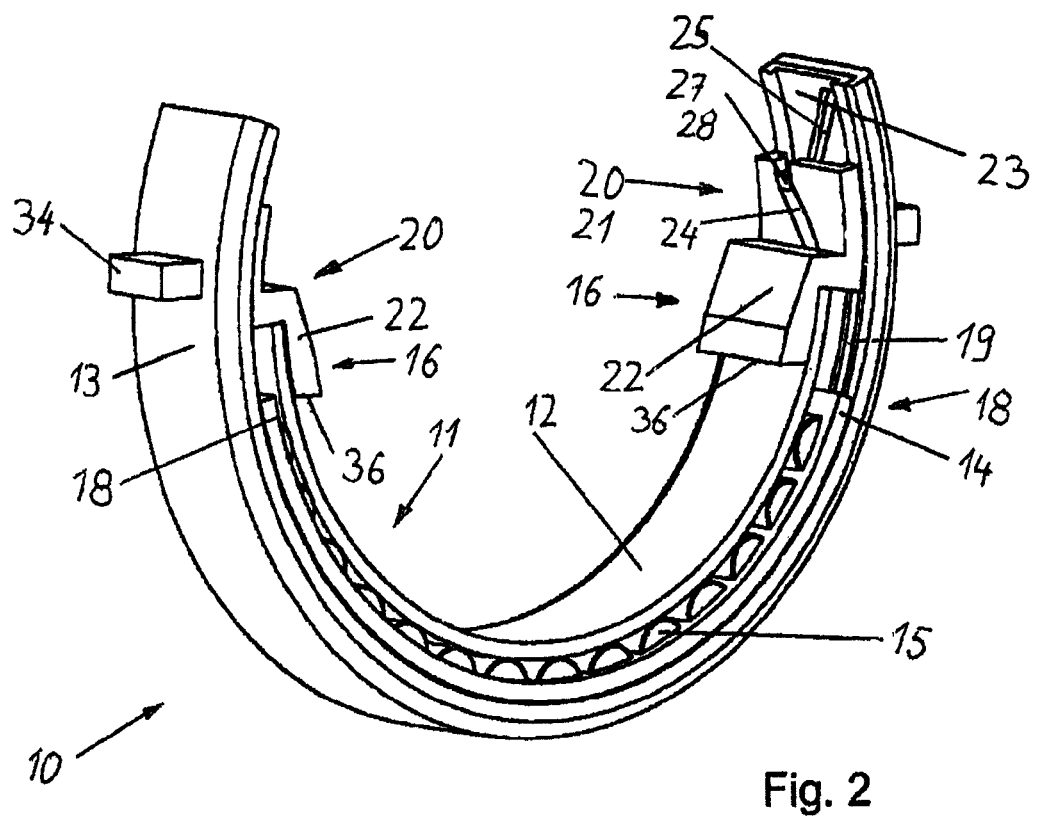
FIG. 2 shows a perspective view of a swashplate pivot bearing according to the invention.

FIG. 2 shows a perspective view of a swashplate pivot bearing 10 according to the invention with the associated timing/tracking mechanism 20 at both ends of the roller bearing arrangement 11 for the swashplate 7, not shown here. The roller bearing arrangement 11 has an inner segment 12, an outer segment 13 and a cage 14, arranged between them, for receiving rollers 15. The functional elements 21 of the timing/tracking mechanism 20 according to the invention are arranged at the end regions of the roller bearing arrangement 11. The functional elements 21 comprise in each case an inner guide 22, connected to the inner segment 12 in its end regions 16, in each case an outer guide 23, connected to the outer segment 13 in its end regions 17, in each case a cage guide 19, not shown here, of the cage 14 and in each case a pin 28 as a guide element 27 or sliding block 27.

The guides 19, 22, 23 have in each case a guide track, the guide track 26 of the cage guide 19 (cf. FIG. 6) being designed necessarily as a continuous slot in the axial direction parallel to the drive/driven shaft 3 of the axial piston machine 1. The guide tracks 24, 25 of the inner guide 22 and of the outer guide 23 can likewise be designed as a continuous slot or as a groove. If the two last-mentioned guide tracks are designed as a slot, care is taken to ensure that the pin 28 guided in the guide tracks is secured against falling out. This may be brought about, for example, by covers on the respective outside of the guide or by a special shape of the guide element 27.

The inner segment 12 of the roller bearing arrangement 11 is connected firmly to the swashplate 7 and the inner guide 22. For this purpose, the inner guide 22 is preferably configured in such a way that it has an extension 36 which is connectable, for example by screwing and/or welding, both to the inner guide 12 and to the swashplate. The outer segment 13 is connected firmly to the housing 2 of the axial piston machine 1, and this may likewise take place, for example, by screwing. For this purpose, the outer segment 13 is provided, for example, at each end region with a tenon 34 provided in each case with one or more bores for the passage of screws which, in turn, engage, for example, in threaded bores in the housing 2.

The swashplate pivot bearing 10 illustrated in FIG. 2, with the timing/tracking mechanism 20 arranged on both sides in its end regions, is in a symmetrical position corresponding to the neutral position of the swashplate 7. In the neutral position, the planar topside of the swashplate 7 stands perpendicularly with respect to the axis of the shaft 3, and in this neutral position, the axial piston machine shows no delivery volume.

With the rotation of the cylinder block 4, the piston sliding shoes 8 slide over the topside of the swashplate 7, without a variable force acting in the axial direction movement of the pistons 6, arises only when the swashplate 7 is in an oblique position, the axial piston machine showing an absorption volume different from zero.

Figure 3:
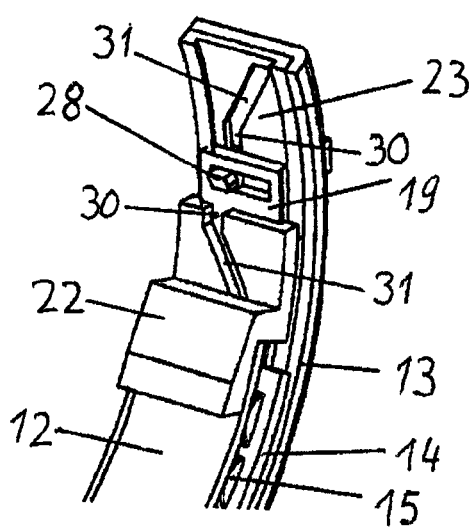
FIG. 3 shows a view in the form of a detail of an end region of the swashplate pivot bearing in which the timing/tracking mechanism is in an inactive position.

FIG. 3 shows a view in the form of a detail of an end region of the swashplate pivot bearing 10, in which the timing/tracking mechanism 20 of one side is in an inactive position. The inactive position shown corresponds to a specific pivot angle of the swashplate 7 in one direction. The selected pivot angle here is, for example, 16°. During the pivoting of the swashplate 7 in a direction starting from the pivot angle 0°, continuous inactive positions are run through, so that an inactive range is defined. In each inactive position in the inactive range, no tracking force is exerted upon the cage 14 on this side. The timing/tracking mechanism 20 is therefore inactive on this side. It is, however, active in the other end region of the swashplate pivot bearing 10, as is explained by means of FIG. 4.

The inactive position, shown in FIG. 3, of the timing/tracking mechanism 20 is present as long as the swashplate 7 is pivoted in a direction in which the end region of the inner segment is displaced in the direction towards the cage. In the inactive range, the pin 28 serving as guide element is located in each case with one end in the in each case first regions 30 of the guide track 24 of the inner guide 22 and of the guide track 25 of the outer guide 23. Since these first regions 30 run in each case in the direction of the pivoting movement, no force is exerted upon the pin 28 during pivoting of the swashplate 7. However, during displacement of the cage 14, the pin 28 is driven, since it is positively guided in the slot, running perpendicularly with respect to the pivoting movement, of the guide track 26 of the cage 14. However, this pin 28 is carried along only passively and does not exert any active controlling action upon the cage 14, that is to say the cage is not pushed in the direction of the other end region.

Figure 4:
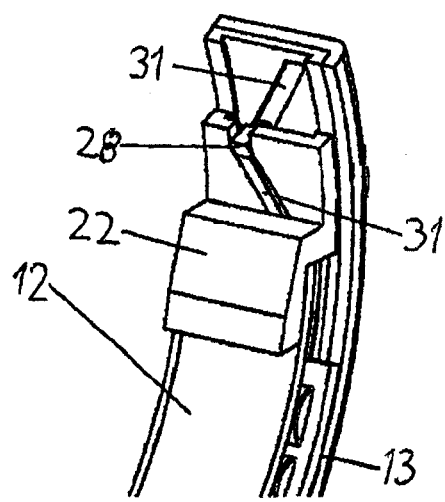
FIG. 4 shows a further view in the form of a detail of an end region of the swashplate pivot bearing in which the timing/tracking mechanism is in an active position.

FIG. 4 shows a view in the form of a detail of an end region of the swashplate pivot bearing 10 in which the timing/tracking mechanism 20 is in an active position. The pivoting state, illustrated in FIG. 4, corresponds to the commencement of pivoting of the swashplate in a direction which is opposite to that of FIG. 3. The inner segment 12 connected firmly to the swashplate 7 and the inner guide 22 coupled to the said inner segment are displaced here with respect to the fixed outer guide 23 to an extent such that the pin 28 carried along by the cage enters the in each case second obliquely running region 31 of the guide track 24 of the inner guide and of the guide track 25 of the outer guide 23. The two second regions 31 of the guide tracks 24, 25 of the inner guide 22 and outer guide 23 begin to intersect, as a result of which, during further pivoting of the swashplate 7, the pin 28 is positively guided both in the direction of the pivoting movement and transversely thereto. A force is thereby exerted upon the cage 14 by the pin 28 in the pivoting direction, with the result that the pin tracks the pivoting of the swashplate 7. The amount of tracking of the cage 14 can be predetermined by the angular position of the obliquely running second regions 31 in the guide tracks 24, 25.

In the pivoting state, illustrated in FIG. 4, of the swashplate 7, the timing/tracking mechanism 20 arranged on the opposite side of the swashplate pivot bearing 10 enters the inactive range, as explained by means of FIG. 3. Accordingly, during the further pivoting of the swashplate 7 in the same direction, the associated timing/tracking mechanism 20 is inactive. The pin 28 undergoes on this side no force from the inner guide 22 and the outer guide 23, since it slides in each case in their first regions 30, running in the pivoting direction, of the associated guide tracks 24, 25. The pin 28 is merely driven passively by the cage 14.

This results overall in a type of operation in which, depending on the direction of pivoting of the swashplate 7, in each case only one timing/tracking mechanism 20 arranged in an end region of the swashplate pivot bearing 10 is active, whereas in each case the other remains inactive. As a result, the stress upon the individual parts of the timing/tracking mechanism 20 is markedly reduced, without the accuracy and reliability of the tracking of the cage 14 being impaired.

Figure 5:
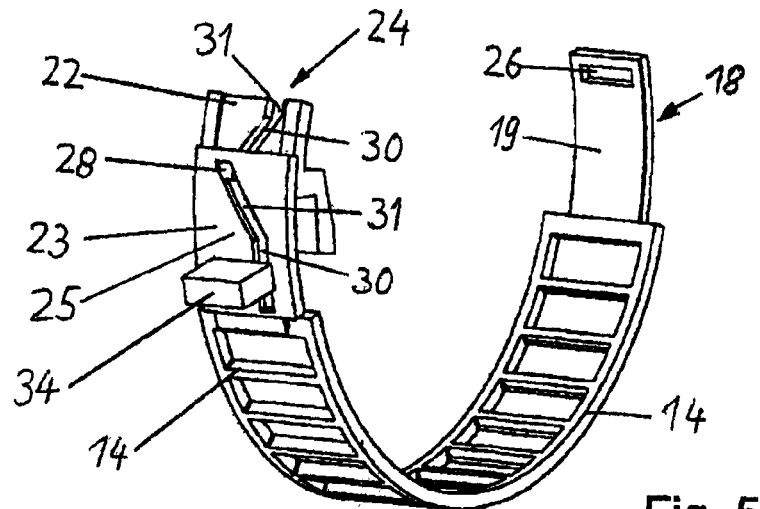
FIG. 5 shows a view of the cage, one end region of which is in engagement with the timing/tracking mechanism.

FIG. 5 shows a view of the cage 14, with an end region 18 of the cage guide 19 in engagement with the timing/tracking mechanism 20. The parts and associated reference symbols correspond here, as in all the other figures, to those already described above. It should be emphasized that end pieces 18 are arranged on the cage 14 at both end regions and are manufactured in one piece with the cage or are connected firmly to the latter. The end pieces 18 serving as cage guide 19 have the same curvature as the cage 14. These end pieces 18 are provided with transverse slots 26 which constitute the guide tracks 26 of the cage 14. Moreover, the end pieces 18 are provided on lateral faces with V-shaped longitudinal grooves which form part of a dovetail connection 33. The dovetail connection 33 comprises as further elements correspondingly complementarily formed regions of the inner guide 22 and of the outer guide 23 which can be seen more clearly in FIGS. 6 to 8. By means of this connection caused by the end pieces 18 of the cage 14, the inner segment 12 and outer segment 13 are connected to one another, so that the swashplate pivot bearing 10 as a whole is present as a unit and can be handled easily. It will be appreciated that the dovetail connection 33 must have sufficient play between the individual parts to ensure that displacement of the cage 14, together with the end pieces 18 carrying the dovetails 35, is possible with little effort. The same applies to the pivoting of the inner segment 12 with the inner guide 22 in relation to the housing-fixed outer segment 13 with the outer guide 23.

Figure 6:
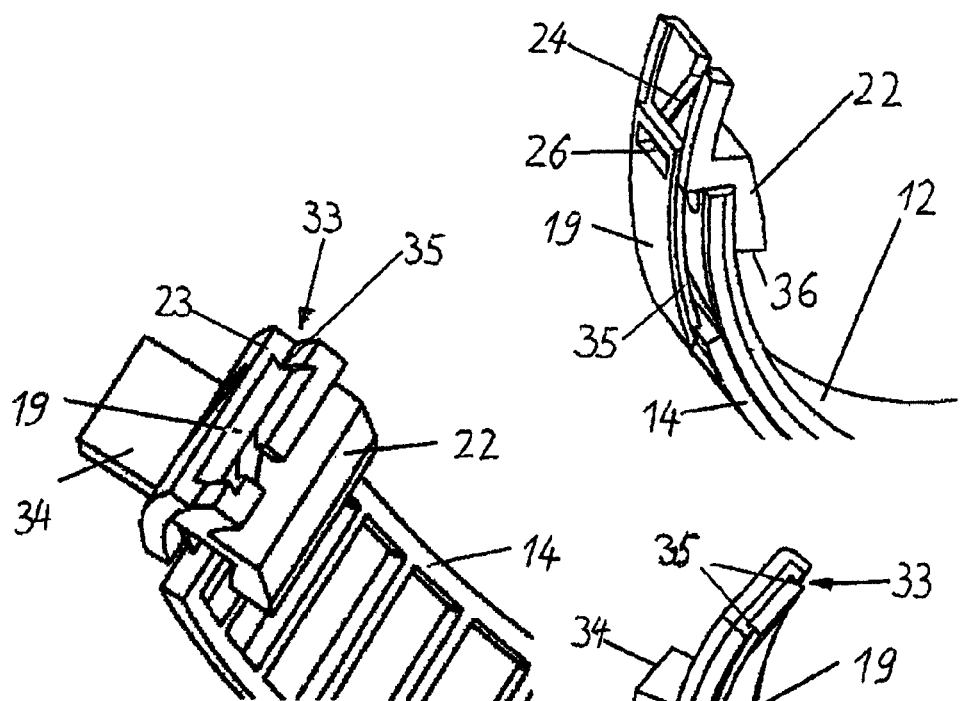
FIG. 6 shows a further view in the form of a detail of an end region of the swashplate pivot bearing in which the outer segment and the outer guide are removed.
Figure 7:
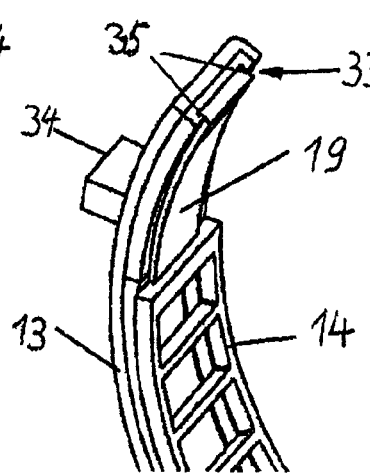
FIG. 7 shows a further view in the form of a detail of an end region of the swashplate pivot bearing in which the inner segment and the inner guide are removed.

FIG. 6 shows a further view in the form of a detail of an end region of the swashplate pivot bearing 10 in which the outer segment 13 and outer guide 23 are removed. The end piece 18 of the cage 14 carries on the opposite side faces the V-grooves which form the dovetail 35 of the corresponding connection. A flank of the V-groove is in each case in engagement with a complementary flank which is formed on the inner guide 22 of the inner segment 12. The connection to the outer segment 13 via its outer guide 23 is illustrated in FIG. 7. This shows a further view in the form of a detail of an end region of the swashplate pivot bearing 10 in which the inner segment 12 and inner guide 22 are removed.

Figure 8:
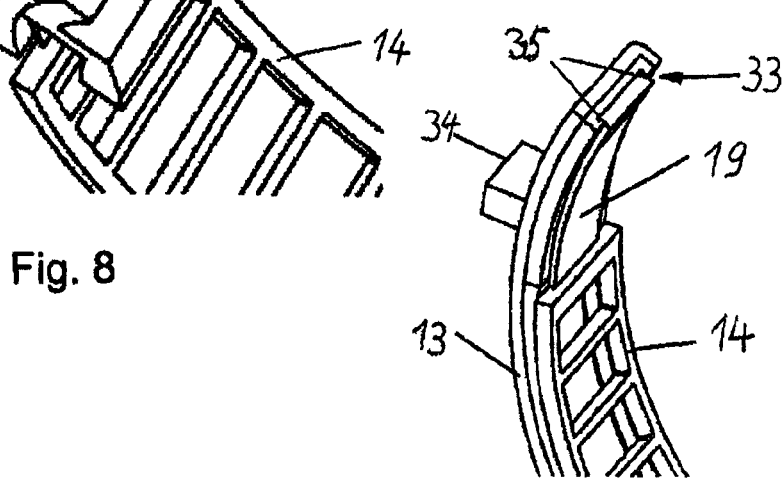
FIG. 8 shows a further view in the form of a detail of an end region of the swashplate pivot bearing obliquely from above.

FIG. 8 is a further view in the form of a detail of an end region of the swashplate pivot bearing 10 obliquely from above, the inner segment 12 and outer segment 13 being removed. FIG. 8 shows a state in which the inner guide 22 and outer guide 23 are connected to one another by means of the dovetail connection 33 made by the end piece 18 of the cage 14.

What is claimed is:

1. A swashplate pivot bearing (10) of an adjustment unit of an axial piston machine (1), in which a swashplate (7) is mounted in a roller bearing arrangement (11) which has an inner segment (12), an outer segment (13) and a cage (14) for guiding a plurality of rollers (15), the rollers (15) being arranged between the inner segment (12) and the outer segment (13), the inner segment (12), outer segment (13) and cage (14) being designed in each case as a circle segment,
the inner segment (12) being connected to the swashplate (7),
the outer segment (13) being arranged on a housing (2) of the axial piston machine (1), and
a timing/tracking mechanism (20) being provided, which controls the movement of the cage (14) with the effect of limited tracking of the movement of the swashplate (7), characterized in that a first and a second timing/tracking mechanism (20) are formed at each end region of the roller bearing arrangement (11), and the first timing/tracking mechanism (20) only takes effect during the pivoting of the swashplate in one direction and the second timing/tracking mechanism (20) only takes effect during the pivoting of the swashplate (7) in the other direction.

2. The swashplate pivot bearing according to claim 1, characterized in that functional elements (21) of the timing/tracking mechanism (20) are arranged outside the path of movement of the rollers (15) of the roller bearing arrangement (11).

3. The swashplate pivot bearing according to claim 1, characterized in that the end pieces (32) of the cage (14) are shaped in such a way that they form a positive and displaceable connection to the inner guide (22) and outer guide (23), the connection holding the inner segment (12) and outer segment (13) together.

4. The swashplate pivot bearing according to claim 1, characterized in that the first and the second timing/tracking mechanisms (20) possess an inner guide (22), an outer guide (23) and a cage guide (19) which have in each case a slot-shaped guide track (24, 25, 26) in which a guide element (27, 28) is guided slidably, and the inner guide (22) is formed on the inner segment (12), the outer guide (23) on the outer segment (13) and the cage guide (19) on the cage (14) in their respective end regions (16, 17, 18) or are connected to them.

5. The swashplate pivot bearing according to claim 4, characterized in that the respective guide track (24, 25) of the inner guide (22) and of the outer guide (23) has a first region (30) extending in the longitudinal direction of the roller bearing arrangement (11) and a second region (31) running obliquely thereto.

6. The swashplate pivot bearing according to claim 4, characterized in that the cage (14) is equipped at each of its two end regions (18) with an end piece (32) in which the guide track (26) of the cage guide (19) is formed.

7. The swashplate pivot bearing according to claims 4, characterized in that each guide element (27) is designed as a pin (28).

8. The swashplate pivot bearing according to claim 1, characterized in that the inner segment (12) and outer segment (13) of the roller bearing arrangement (11) are connected to one another, and the inner segment (12) is connectable to the swashplate (7) and the outer segment (13) is connectable to the housing (2) of the axial piston machine (1).

9. The swashplate pivot bearing according to claim 8, characterized in that the connection is designed in the manner of a two-sided dovetail (35), in each case one side of the dovetail (35) cooperating with the inner guide (22) and the other side with the outer guide (23).

10. A swashplate pivot bearing (10) of an adjustment unit of an axial piston machine (1), in which a swashplate (7) is mounted in a roller bearing arrangement (11) which has an inner segment (12), an outer segment (13) and a cage (14) for guiding a plurality of rollers (15), the rollers (15) being arranged between the inner segment (12) and the outer segment (13), the inner segment (12), outer segment (13) and cage (14) being designed in each case as a circle segment,
the inner segment (12) being connected to the swashplate (7),
the outer segment (13) being arranged on a housing (2) of the axial piston machine (1),
a timing/tracking mechanism (20) being provided, which controls the movement of the cage (14) with the effect of limited tracking of the movement of the swashplate (7), characterized in that a first and a second timing/tracking mechanism (20) are formed at each end region of the roller bearing arrangement (11), and the first timing/tracking mechanism (20) takes effect during the pivoting of the swashplate in one direction and the second timing/tracking mechanism (20) takes effect during the pivoting of the swashplate (7) in the other direction;

wherein the first and the second timing/tracking mechanisms possess an inner guide (22), an outer guide (23) and a cage guide (19) which have a slot-shaped guide track (24, 25, 26) in which a guide element (27, 28) is guided slidably, and the inner guide (22) is formed on the inner segment (12), the outer guide (23) on the outer segment (13) and the cage guide (19) on the cage (14) in their respective end regions (16, 17, 18) or are connected to them;

the respective guide track (24, 25) of the inner guide (22) and of the outer guide (23) has a first region (30) extending in the longitudinal direction of the roller bearing arrangement (11) and a second region (31) running obliquely thereto; and the guide track (26) of the cage guide (19) runs essentially perpendicularly with respect to the in each case first regions (30) of the guide tracks (24, 25) of the inner guide (22) and outer guide (23).

* * * * *